United States Patent

[11] 3,615,881

[72] Inventor William J. Greene
Bound Brook, N.J.
[21] Appl. No. 767,765
[22] Filed Oct. 15, 1968
[45] Patented Oct. 26, 1971
[73] Assignee Air Reduction Company, Incorporated
New York, N.Y.

[54] METHOD OF FORMING FLUX PINNING SITES IN A SUPERCONDUCTING MATERIAL BY BOMBARDMENT WITH AN ION BEAM, AND THE PRODUCTS THEREOF
9 Claims, 7 Drawing Figs.

[52] U.S. Cl. .......... 148/4,
148/32, 148/133, 174/DIG. 6, 250/49.5 T
[51] Int. Cl. .......... C23f 7/00
[50] Field of Search .......... 219/121
EB; 174/DIG. 6; 335/216; 148/4, 32, 133;
250/49.5 PI, 49.5 TI, 49.5 R

[56] References Cited
OTHER REFERENCES

Hines et al.; Journal of Applied Physics; Vol. 32, No. 2; (1961); pp. 202 to 204.
Electronics Review; Vol. 38, No. 1; (1965); pp. 35, 36
Kernohan et al; Journal of Applied Physics; Vol. 38, No. 12; (1967); pp. 4904 to 4910

*Primary Examiner*—James W. Lawrence
*Assistant Examiner*—A. L. Birch
*Attorneys*—H. Hume Mathews and Edmund W. Bopp

ABSTRACT: This relates in general to superconductive materials, and more particularly to vacuum-deposited superconductive films having improved characteristics.

INVENTOR
WILLIAM J. GREENE
BY
Stefan J. Klauber
ATTORNEY

INVENTOR
WILLIAM J. GREENE
BY
Stryan J. Klauber
ATTORNEY

CATHODE POTENTIAL

INVENTOR
WILLIAM J. GREENE
BY
[signature]
ATTORNEY

METHOD OF FORMING FLUX PINNING SITES IN A SUPERCONDUCTING MATERIAL BY BOMBARDMENT WITH AN ION BEAM, AND THE PRODUCTS THEREOF

BACKGROUND OF THE INVENTION

As is well known, superconducting materials are roughly classified into two general types. Type I superconducting materials, when cooled below their critical temperature $T_o$, exclude magnetic flux in all fields up to a critical value $H_c$, beyond which the flux completely penetrates the sample, thereby destroying the superconducting state and causing normal resistance to reappear. Type II superconducting materials completely exclude magnetic flux up to a field $H_{c1}$, above which there is a gradual flux penetration in quantum units called "fluxoids," until at a field $H_{c2}$ the flux penetration becomes complete, destroying superconductivity. Within the region between $H_{c1}$ and $H_{c2}$ (called the "mixed state") the fluxoids enter into the Type II material reversibly, without destroying the superconductivity. The differences between Type I and Type II materials are determined by the relationship between the coherence distance and the penetration depth in each. For the purposes of this specification and the claims, the "coherence distance" is defined as the minimum distance required for a superconducting phase to vanish and a normal phase to appear; and, the " penetration depth" is defined as the depth in a superconductor to which magnetic fields can penetrate and superconducting currents can flow. If the coherence distance is much larger than the penetration depth, the superconducting material is Type I; whereas, if the reverse is true, the material is Type II.

In Type II superconductors comprising pure monocrystalline material, the fluxoids are free to move about in a field gradient, producing losses due to eddy currents induced in the normal region at the center of the fluxoid. To permit lossless current conduction, the fluxoids must be held in place within potential wells called "pinning sites." These may consist of dislocations, grain boundaries, foreign atoms, etc. in the crystal lattice, which produce nonuniformities whose dimensions are at least of the order of the coherence distance in the superconductor.

It has been the practice in the prior art to irradiate superconductors with neutrons or protons in an attempt to form "-pinning sites," and thereby to improve the superconducting properties of the treated material. However, treatment in this manner is not commercially feasible, since the equipment required to carry out such treatment is not available to the general public. Moreover, in accordance with certain prior art practices, it has also been attempted to improve the characteristics of superconductors by the liberation of hydrogen ions into superconductive host material by electrolytic means. This has been found to be less than satisfactory for producing pinning sites in the lattice structure of superconductive materials, since the liberated hydrogen ions tend to form hydrides with the host material. Furthermore, the hydrogen ions, without combining to form hydrides, are too small to cause lattice disorientations of sufficient magnitude to substantially increase the current density in superconducting material. In addition, in prior art processes, as presently practiced, the voltages impressed across the electrolytic cells are relatively low, causing the ions to move at low velocities, so that the depths of implantation of the ions in the host material are slight. Thus, this method is relatively ineffective for causing lattice disorientation of the type required for the purposes of the present invention.

It is a principal object of the present invention to provide superconductive material of substantially improved, controlled current-carrying characteristics. Other objects of the invention are to provide more efficient and economical techniques than known in the prior art for the large scale production of superconductors of superior quality.

BRIEF DESCRIPTION OF THE INVENTION

These objects are realized, in accordance with the present invention, in a system wherein Type II superconductive material is bombarded with high velocity, heavy ions which penetrate deeply into the material, causing disorientations in the lattice structure of sufficient magnitude to serve as flux pinning sites when the material is operated as a current carrier in a cryogenic environment below its critical temperature, and at field strengths between $H_{c1}$ and $H_{c2}$. In accordance with a particular embodiment of the invention, it is contemplated that ion bombardment can be carried out most efficiently in combination with a vacuum deposition process in which one or more layers of superconductive film are first deposited on the surface of a substrate, which may take the form of a wire or ribbon, being progressively moved from one point to another along a preselected course ultimately passing an area on which high velocity bombarding ions are focused.

For example, a ribbon substrate, which may comprise any suitable material, including metals or ceramics, such as nickel-bearing steel, is moved at a uniform rate from one reel to another, inside of an evacuated chamber. Assuming, for example, that the superconductive film to be deposited is $Nb_3Sn$, crucibles of molten vacuum-melted niobium and molten vacuum-melted tin are mounted in adjacent positions on a supporting hearth inside of the vacuum chamber. Electron guns are focused on the respective surfaces of molten niobium and molten tin in the crucibles, in such a manner that beams of vapor are directed to rise in overlapping relation from each of the said crucibles, to impinge at a controlled rate on the passing surface of a ribbon substrate, depositing thereon a continuous composite strip of film which, in the example under description, is about 10,000 Angstroms thick. As the substrate ribbon, coated with a film of $Nb_3Sn$, passes to a position beyond the scope of the vapor deposition beams, it moves within the purview of a beam of high velocity ions. In a preferred example, the ion source is a gun constructed to generate a beam of high velocity xenon ions. These are focused magnetically to impinge on the passing $Nb_3Sn$ film in a thin line, with sufficient energy to pass completely through the film. Individual ions become embedded in the crystal lattice of the $Nb_3Sn$ film, producing therein discontinuities which form "pinning sites" in the structure.

It is anticipated in accordance with the present invention that, in addition to irradiation by an ion gun, high velocity ions can be driven into the lattice structure of the treated superconducting film by other means. For example, in an alternative embodiment, the superconductive film under preparation assumes a target position by passing adjacent the cathode in an energy transfer device having an environment comprising ions of a heavy inert gas. When the device periodically ceases to conduct, a high potential difference is imposed across the electrodes, and the heavy gas ions are directed toward the cathode at high energies, embedding themselves in the passing superconductive film.

The product formed by the processes described in the foregoing paragraphs, when incorporated in the proper cryogenic environment, operates as a superconductor having a substantially improved current carrying capacity, in excess of $1\times10^6$ amperes/cm.$^2$ at 40 kilogauss. A further advantageous characteristic of superconducting material prepared by one of the methods of the present invention is that its anisotropy is substantially decreased over that of conductors which have not been subjected to ion bombardment.

Other objects, features, and advantages will appear to those skilled in the art from a study of the specification hereinafter with reference to the attached drawings.

SHORT DESCRIPTION OF THE DRAWINGS

DETAILED DESCRIPTION OF THE DRAWINGS

Figure 1A:
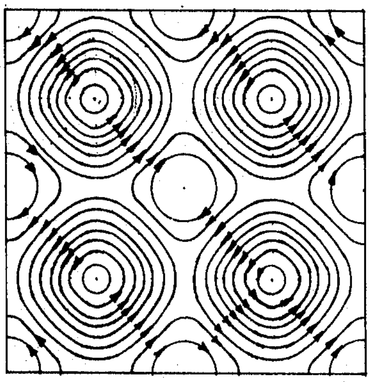
FIGS. 1A and 1B are diagrams showing flux patterns in Type II superconductors in an explanation of certain theory in accordance with the present invention.

Referring to FIG. 1A of the drawings, there is indicated schematically a simple, pure Type II superconductor, without substantial imperfections, into which the flux penetrates in the form of quantum units called "fluxoids" which are believed to take the form of flux filaments, as pictured, in a regular structural arrangement. The centers of these flux filaments or "-fluxoids" are located at order-parameter minama. Research has shown that a Type II superconductor, in the "mixed state," without substantial imperfections, is characterized by vortex currents which may reach as high as $10^7$ amperes per square centimeter near the core of the flux line, raising the question of to what extent the Type II superconducting material can carry dissipationless transport current. If the transport current is perpendicular to the magnetic field, the flux lines tend to move laterally to equalize the magnetic pressure, giving rise to substantial resistance to passage of the transport current.

Figure 1B:
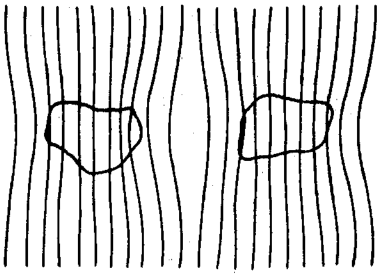

It has been found that the current carrying capacities of Type II superconductors are greatly increased by the introduction into the crystal lattice of a suitable defect structure. The defects have been found to be very effective in hindering the lateral motion of the flux filaments (fluxoids). In the language of the art, the flux filaments or fluxoids are said to be "pinned down" by the defects. In the presence of such defects or imperfections in the crystal structure, the simple magnetic properties of Type II superconductors undergo a radical change, as indicated in FIG. 1B, which is a schematic view of flux filaments (fluxoids) interacting with attractive defects to provide a greatly increased current carrying capacity.

Different techniques, such as bombardment of superconducting materials with neutrons, protons, and electrons have been employed in the prior art in an attempt to increase their critical current density.

It has been found in accordance with the present invention that superior results are obtained in improving the current carrying capacity of Type II superconductors having an ordered lattice structure by bombarding the subject materials with high velocity inert ions, preferably of high atomic weight, such as those of the noble gases, including, for example, ions of argon or xenon. It is contemplated that materials suitable for treatment in accordance with the present invention will include any Type II superconductor having an ordered lattice structure. Materials particularly suitable for treatment in accordance with the techniques of the present invention are any of those Type II superconductive materials susceptible to vapor deposition in a vacuum on a nonsuperconducting substrate. A principal example is $Nb_3Sn$. Other related materials of similar crystallographic structure which would also be suitable, are, for example, $V_3Ga$, $V_3Si$ and $Nb_3Al$. Other materials deemed suitable are NbTi, NbZr, NbN. However, it is to be understood by those skilled in the art that practice of the invention is by no means restricted to the particular materials mentioned, or necessarily, to composite materials, but can be applied to single component superconductors, such as a layer of niobium. In every case, it is preferred that the thickness of the treated coating should not exceed a few microns.

By way of example, the process of the present invention will be described with reference to a system for the vacuum deposition of $Nb_3Sn$, such as disclosed in FIG. 2A of the drawings.

In the system illustrated, superconductive films are formed to a thickness lying within the range of hundredths of angstroms to hundredths of microns, with relatively high transition points and high current carrying capacity, by means of the simultaneous controlled vaporization of the elements of a superconductive compound or alloy from two or more sources under high vacuum conditions. Unless otherwise specified, the expression "film" as used herein, means a film with a thickness lying in the above-mentioned range, usually less than 1 millimeter. The simultaneous vaporization of a quantity of elements from various sources is precisely controlled in order to precipitate these elements on a substrate in the required proportions for the formation of a chemical compound or an alloy with a precisely known composition. $Nb_3Sn$ is formed in the manner indicated by vaporization from separate sources of niobium and tin. In preferred practice, films of $Nb_3Sn$ are formed to have transition points lying above 17° Centigrade and with a high current carrying capacity.

It has been found in accordance with the prior art that when the parameters of the disclosed method are controlled within reasonably narrow limits, it is possible to economically produce superconductive films of high purity and uniformity which are characterized by transition temperatures lying within very close tolerances. In accordance with the present invention, the current carrying capacity of these films is further improved by ion implantation in a manner which will be described in detail hereinafter.

Figures 2A, 2B:
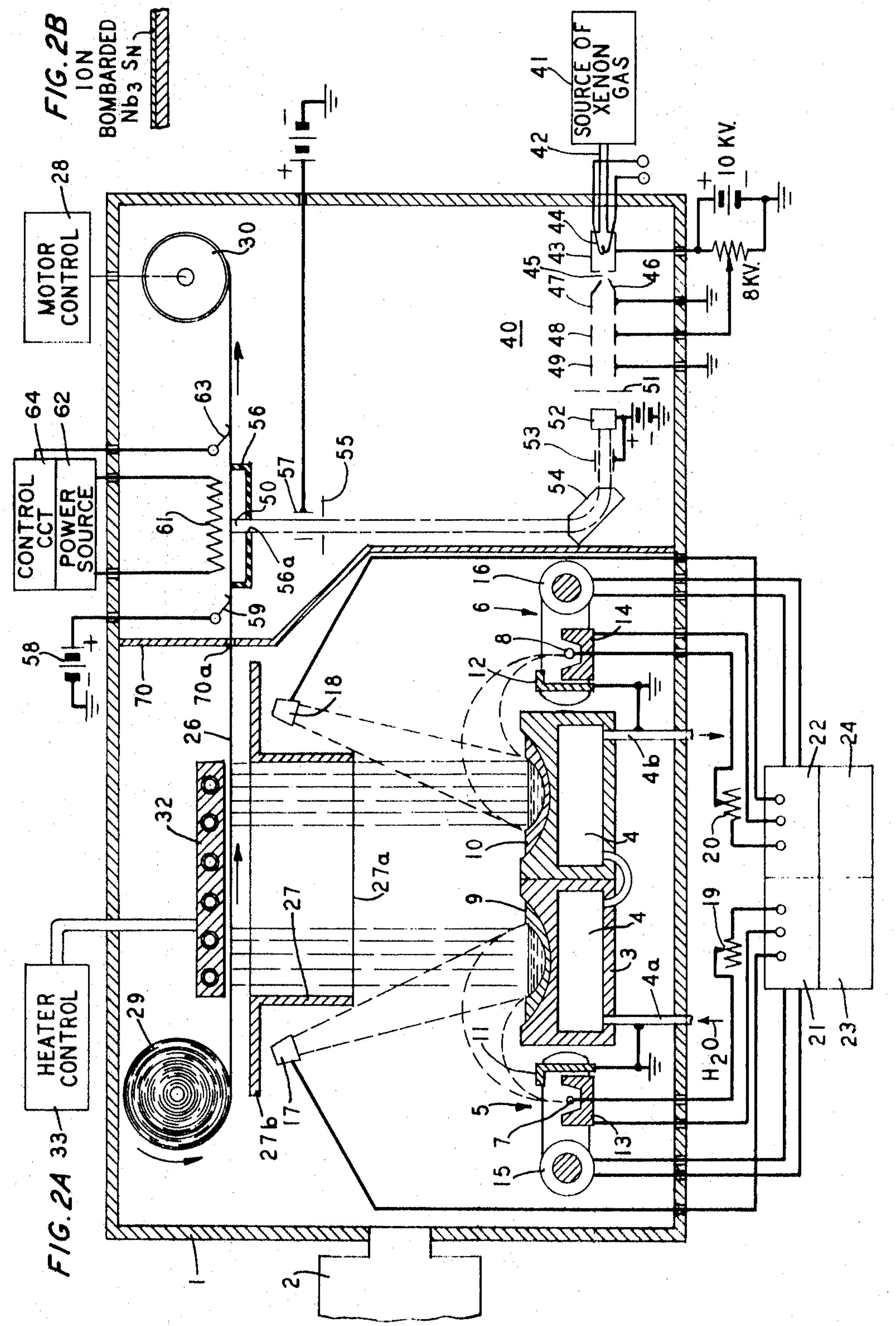
FIG. 2A is a schematic diagram of an apparatus combination, including an ion gun, for preparing improved superconductive material in accordance with the present invention.
FIG. 2B is an enlarged showing in longitudinal section of the product of the present invention.

Referring to FIG. 2A of the drawings, there is shown a housing 1, rectangular in section and formed, for example, of stainless steel, which is constructed in a manner especially suitable for evacuation to low pressures, preferably less than $10^{15}$ torr. For the purposes of evacuating the housing 1, a very large duct 2, for example, is provided leading to a suitable vacuum conventional pump (not shown). Supported within the housing 1 is a hearth 3 comprising some type of ceramic material, which, in preferred arrangement, is equipped with a system of cooling ducts 4, having inlet and outlet pipes 4*a*, 4*b*, in which a suitable cooling agent is circulated, such as, for example, cold water, so that during the time the process is in operation, the hearth is maintained at a relatively low temperature. A pair of crucibles 9 and 10 formed, for example, of platinum, are disposed in the top of the hearth 3, to serve as crucibles in which the substances to be vaporized are contained. It is contemplated that there are means (not shown) for feeding fresh material to the crucibles 9 and 10, in order to permit a continuous operation of the device.

In combination with each of these crucibles 9 and 10, electron guns 5 and 6 are respectively disposed in a manner to provide sufficient electron bombardment for heating the substance in each crucible to a desired temperature for vaporization. The control of each of the electron guns 5 and 6 is carried out in such a manner as to provide the precise rate of the desired vaporization. As shown in FIG. 2A, the electron guns 5 and 6 are each placed at preferably about the same distance below the respective crucibles, although it is contemplated that other arrangements can also be used, with the electron gun 6, for example, placed somewhat higher.

In FIG. 2A, each of the electron guns 5 and 6 have respective feeds 7 and 8 in the general form of elongated rods, acceleration anodes 11 and 12, and respective focusing cathodes 13 and 14. The components are of a form generally known in the art of electron guns, any suitable construction or arrangement thereof being applicable for the purposes of the present invention.

In the arrangement under description, horseshoe-shaped magnets 15 and 16 are respectively placed astride each of the electron guns 5 and 6. These serve to control the streams of electrons striking the surfaces of molten metal in each of the crucibles 9 and 10. In general, the fields of each of the horseshoe magnets 15 and 16 lie perpendicular to the path of the electrons coming from the respective electron guns 5 and 6. Accordingly, the electrons are bent toward each of the surfaces of the material in the respective crucibles 9 and 10 along a preselected path.

Electron guns of the general type suitable for the purposes of the present invention are mentioned in U.S. Pat. No. A. O. DuBois et al. 3,132,198 issued May 5, 1964. However, as previously pointed out, any other suitable device can be employed, using electron beam bombardment, or some other adjustable kind of heating, for causing clouds of metal vapor to rise in a quantitatively and directionally controlled manner from the surfaces of the molten metal in crucibles 9 and 10.

In order to be able to precisely control the rate of vaporization of each of the crucibles 9 and 10, suitable monitoring devices 17 and 18 are mounted in the paths of each of the respective beams. For this purpose, a device of the type indicated in C. W. Hanks U.S. Pat. No. 3,390,249, issued June 25, 1968, or some other suitable device, is employed which can be readily calibrated to indicate the rate at which atoms leave the surface of the molten metal in the crucibles 9 and 10. Referring to FIG. 2A, the monitors 17 and 18 are mounted at a high level, vertically disposed over the respective crucibles 9 and 10. A shield 27, comprising an inwardly extending cylindrical aperture **27*a* and a laterally extending flange 27*b*, is employed for the purpose of limiting the field of each of the respective monitors 17 and 18 to the crucible with which it is associated, by effectively blocking the line of sight between each said monitor 17 or 18** and the surface of the nonassociated crucible.

The rates of vaporization of the molten metal in each of crucibles 9 and 10 are separately regulated by means of a pair of electronic control systems 21 and 22. The latter are respectively responsive to feedback potential derived from the monitors 17 and 18 to control the rise and fall of power supplied to the generating elements of electron guns 5 and 6 from respective power sources 23 and 24, in accordance with the variation in rates of evaporation from the respective crucibles 9 and 10, to maintain the evaporation rates at a substantially constant preselected rate, in each case.

The power sources 23 and 24 are conventional batteries, power packs, or other well-known sources of power. The control systems 21 and 22 may comprise, for example, electronic tracking systems of a type which operate to restore to normal a condition of unbalance between an output signal and a preselected reference signal. One circuit which may be readily adapted for this purpose is disclosed in T. J. Scarpa U.S. Pat. No. 3,336,485, issued Aug. 15, 1967. Other suitable circuits for performing this function will be apparent to those skilled in the art.

Alternatively, it will be apparent that control systems 21 and 22 are designed in the present application to also provide manual means comprising rheostats 19 and 20 for adjusting the desired rate of vaporization. It is also contemplated that control systems 21 and 22 can include means by which the ratio of the rates of vaporization of the materials in the separate crucibles 9 and 10 are maintained at a preselected figure, while the absolute rates of vaporization are changed by separate controlling means. Such circuits are well known to those skilled in the art.

Substrate ribbon 26, on which the superconductive material is deposited, is mounted between a pair of reels 29 and 30 disposed in the upper part of the housing 1, so that the ribbon moves in the direction of the arrow along a plane parallel to the base of the shield 27 so that one face of the passing tape is disposed through the aperture **27*a* in substantially a direct line above crucibles 9 and 10. Although the distance between substrate 26 and crucibles 9 and 10 appears in FIG. 2A to be substantial, in practice, this distance may be within the range of about 5 to 50 centimeters. The substrate 26 is shown in FIG. 2A in the form of a roll of material, of a type to be described hereinafter, which is mounted to be continuously driven along behind a circular opening 27*a* at a preselected tape speed, by a motor (not shown) which is actuated by a control device 28. When using a ribbon substrate of the type described, a long strip of superconductive film is produced, the thickness of which is determined by the speed at which the substrate 26 is moved across the opening 27*a*, and the rate of vaporization of the substances from crucibles 9 and 10. Although the feed roll 29 and the take-up roll 30 of the substrate-drive system are shown in FIG. 2A as localized inside housing 1, it will be noted that the rollers 29 and 30 may alternatively be placed outside the housing 1, making use of the suitable seals on the sides of the housing to permit entrance and exit of substrate 26** without causing leakage into the vacuum chamber.

Suitable heating elements 32 are mounted adjacent the undersurface of the substrate 26 along the portion on which the superconductive material is deposited, for the purpose of regulating its temperature. In order to make a superconductive film with the desired properties, it is important that the substrate 26 be maintained at a preestablished temperature during the process. Any suitable heating means can be used for the purposes of the present invention. Heating elements 32 shown in FIG. 2 may take the form of a simple resistance-heating source equipped with control system 33 to monitor the temperature of substrate 26 and control the power fed into the heating element 32 in such a manner as to keep this temperature at a preselected level. This function can be carried out using a feed-back controlled electronic circuit basically similar to 21 and 22, described hereinbelow.

The composition of substrate 26 depends on the superconductive material to be produced. Use is made of a material which does not react chemically with the superconductive material, and is not deteriorated by the temperatures to which it is heated, nor by the ion bombardment to be described hereinafter. The thermal expansion coefficient of the substrate material should match that of the brittle superconductor to avoid bimetallic strip action which places the superconductor in tension. In fact, it is considered desirable that the thermal expansions of the substrate and of the deposited film should preferably be such as to place the latter under slight compression. In most cases, either metal or ceramic substrates are used. For the purposes of the present invention, a metal substrate is preferred, such as, for example, a thin ribbon, 10 millimeters wide and 50 microns thick, of a nickel-bearing steel alloy known by the trade name "Hastalloy B" (Union Carbide Corporation). It will be understood, however, that other metallic and nonmetallic substrates may be used in addition to the foregoing, such as silicon monoxide deposited to a thickness of between 1 and 200 angstroms on a steel base.

In the technique of simultaneously evaporating a quantity of substances from separate sources, for the purpose of making a product with precisely known composition, the ratio of the rates of deposition is important. It will be apparent that the specific numerical ratio of these rates is a function of the special composition of the alloy or compound that is formed. For example, a suitable superconductive film of $Nb_3Sn$ can be formed by means of the foregoing process. When films of material are prepared in the manner previously mentioned, it is meaningful to refer to the rate of deposition in terms of angstroms per second. For deposition of $Nb_3Sn$ with a transition point in the desired range and with a fairly good current carrying capacity, prior to the step of ion bombardment to be described hereinafter, it has been found that the ratio of the rate of deposition of niobium with respect to the rate of deposition of tin should preferably lie between 1.95 and 2.15.

The absolute rate of deposition of the separate substances on the substrate 26 depends on the degree of vacuum. When the pressure inside housing 1 is about $10^{15}$ torr, the rate of deposition of tin should be at least 80 angstrom units per second; therefore, the corresponding rate of deposition of niobium should be at least about 160 angstrom units per second. When the vacuum has to be maintained, even at higher levels, of the order of about $10^{17}$ to $10^{18}$ torr, proportionally lower deposition rates can be used without harmfully affecting the purity and the properties of the finished superconductive film.

Even using an idealized control device, it is difficult to control the rates of deposition of two or more substances with the necessary precision to prevent small fluctuations in the stoichiometry of the resulting compound. If the substrate 26 is maintained at a relatively high temperature, sufficient diffusion may take place in the exposed film to even out small stoichiometric fluctuations, and thereby keep the resulting superconductive film uniform through its thickness and within the desired tolerances for physical properties. With the use of a sheet of some suitable metal as substrate for the deposition of $Nb_3Sn$, it has been found that a temperature of about 850° Centigrade is sufficient for this purpose.

Inasmuch as it is not practical to measure the rate of deposition of either the niobium or the tin directly, the measurements are carried out indirectly by means of monitoring devices 17 and 18. Because the rate of deposition of each substance is directly proportional to its rate of vaporization, measurements can be made by calibrating the monitor devices 17 and 18 in such a manner that the rates of deposition can be read directly. On the basis of the conditions set forth above, the rate at which niobium and tin atoms impinge on the substrate 26 to form the compound $Nb_3Sn$, is approximately 100 times as great as the rate at which the residue gas molecules inside the housing 1 impinge on the substrate. Maintenance of this relationship prevents the formation of any excess unwanted compound on the substrate 26 as a result of a reaction between the metals to be vaporized, and oxygen, nitrogen, hydrogen, carbon dioxide, methane or other molecules, from which a residue gas within the housing 1 is composed. Inasmuch as the superconductive properties of a film diminish as the percentage of impurities rise, it is important that the formation of excess impurities in the film should be avoided. It is also important that the vaporized substances be of a high degree of purity.

In order to further improve the superconductive film after vapor deposition of the layers has been completed in the manner previously described, the film-coated tape 26 continues to move in the direction of the arrow, in the plane of FIG. 2, into a position in which the film surface is bombarded by a beam 50 of high velocity heavy ions, preferably of an inert heavy gas such as, for example, xenon, which has an atomic weight of 131.3. Other materials suitable for application in an ion gun in accordance with the present invention include molybdenum, zirconium, hafnium, lead, mercury and argon.

The ion bombardment gun 40 includes an ion source, a beam-forming electrode system, a mass analyzing magnet, and a target area, which includes the moving superconductor-coated tape. A system of a type suitable for the purposes of the present invention is described, for example, by W. J. Kleinfelder in an article entitled "Properties of ion-implanted boron, nitrogen, and phosphorus in single-crystal silicon," Stanford University, Stanford, California, Tech. Rept. K701—1, Mar. 1967. The ion source may include, for example, a crossed field ionizer such as that described in an article by K. O. Nielsen entitled "The Development of Magnetic Ion Sources for an Electromagnetic Isotope Separator," Ncl. Instr., Vol. 1, pages 289–301, 1957.

A gas such as, for example, xenon, is derived from a source 41, which comprises a conventional cylinder in which the gas is stored at ambient temperature, and under suitable pressure. A stream of gas, flowing at the rate of less than $10^{16}$ standard cubic feet per minute, is released into a conduit 42 which is passed through the walls of the evacuated housing 1 by means of a gas-tight seal, and into the cylindrical anode 43, at a pressure of about $10^{13}$ torr. Filament 44 which may, for example, be formed of tantalum, emits electrons which spiral toward the anodes in crossed electric and magnetic fields. A coil which is concentric with the cylindrical anode, and external to it, is designed to generate a magnetic field of about 100 gauss, as explained in detail in Kleinfelder, *supra*. This causes the gas atoms to be ionized along their trajectory, thereby producing a plasma, which is extracted through a small hole 45 in the flat end of the cylindrical ionizer anode 43 by the application of a potential difference of, say 10,000 volts between the anode cap and extractor electrode 46, which has the shape of a frustrum of a cone. The extracted plasma ions move at an accelerated rate in a direction parallel to the principal axis of extractor electrode 46, and are shaped into a narrow focused beam by passing through the electrostatic lens system operated at a negative potential with respect to the plasma. This includes grounded pairs of parallel plates 47 and 49, separated by biased parallel plates 48. At the output of the electrostatic lens is a plate 51 having a 0.25 inch hole at its center which serves to collimate the beam ahead of the mass analyzing magnet 54. Deflecting plates 52 and 53 serve to impose a triangular sweep on the plasma beam as it is directed at the mass analyzing magnet 54. This produces an emerging beam for analyzing magnet 54 which is of substantially uniform vertical direction.

Mass analyzing magnet 54 is designed to generate a uniform flux of up to 10,000 gauss, which is sufficient to provide a separation of the desired ions at the mass spectrometer output. Exit slit 55, disposed at the output flange of the spectrometer, serves to eliminate stray ions. Ions emerging from the slit 55 are segregated in accordance with a preselected charge-to-mass ratio, and are characterized by a total energy of, say, 10,000 electron volts. At this point, the ion beam is approximately one-fourth of an inch wide, and an inch high. Adjacent the moving ribbon target, the beam 50 is swept in a horizontal direction by deflecting plates 57 to maintain the target at substantially uniform intensity over the area of exposure. The ion beam is further accelerated by elevating the target to a potential of the order of 100,000 electron volts by means of a potential source 58, connected to a contacting brush 59, which continuously bears on the uncoated metallic upper face of the moving ribbon substrate 26. A heating unit 61, energized by power source 62, is disposed adjacent the upper side of ribbon 26, and is adjusted to maintain the passing ribbon at a temperature of about 700° C. during the bombardment operation. A thermocouple 63 is also attached to a brush contacting the upper face of the passing substrate 26. This contact feeds back signals to a control circuit 64 which operates in a manner similar to control circuits 21 and 22 to maintain the temperature of the passing substrate ribbon substantially constant.

The shield 56, comprising, for example, stainless steel, has a half-inch hole in its center to further collimate the beam. This element has a contour designed to prevent arcing and field emission at the high voltage to which it may be raised.

Although the present illustrative system includes the mass analyzing magnet 54 for segregating desired components of the beam, and deflecting plates 57 for sweeping the beam periodically across the target, it is contemplated that the complexity of the system could be substantially reduced by the use of a system providing a semifocused or unfocused collimated beam which does not employ mass spectrometer separation and scanning irradiation methods. In the latter case, reliance would be placed on a fairly wide focus of the beam for reaching all parts of the target area simultaneously.

The following specific example illustrates a method in which some of the aspects of the invention are included.

The system shown in FIG. 2A of the drawings and described in the foregoing pages, is employed in the following manner. A quantity of vacuum melted niobium, characterized by an impurity count of 30 or less parts per million, is placed in crucible 9. In other crucible 10 there is placed a quantity of vacuum melted tin, characterized by an impurity count of 10 or less parts per million. The housing 1 is vacuum pumped to a pressure of about $10^{15}$ torr.

A quantity of substrate strips 26 is set up on rollers 29 and 30 in a parallel arrangement about 25 centimeters vertically above the surface level of the two crucibles 9 and 10, disposed to pass beneath the shield 56 in an area normal to ion beam 50. Long rolls comprising, for example, bands of nickel-bearing steel known by the tradename "Hastalloy" of the Union Carbide Corporation, having a thickness of about 50 microns, are used for the substrate strips 26. The substrate heaters 32 function to maintain the portion of the substrate strips 26 upon which deposition takes place at a temperature of about 850° C. The mask 27 is interposed with its opening 27a in a position between the surface of the moving tape 26 in the paths of the beams of vapor generated in the respective crucibles 9 and 10, so that one surface of the passing tape is simultaneously coated with composite layers of niobium and tin.

Potential is applied across the electron guns 5 and 6, horseshoe magnets 15 and 16 being adjusted to focus the electron streams on the respective surfaces of niobium and tin in crucibles 9 and 10. After the formation of pools of molten niobium and molten tin in the respective crucibles 9 and 10, the vaporization begins. Controlling means 21 and 22 are respectively adjusted so that sufficient niobium is vaporized to give rise to a rate of vaporization on the substrate 26 of about 160 angstroms per second, and so that the rate of vaporization of the tin is about 80 angstrom units per second. The piezoelectric velocity monitors 17 and 18 function to measure the rate of vaporization, each being initially calibrated to produce the desired rate of deposition of each component vapor on the moving substrate 26. The back coupling of the monitors 17 and 18 functions in accordance with a well known feedback principle to regulate the power supplied to the filaments 7 and 8 of electron guns 5 and 6, to maintain evaporation from each of the crucibles at a preselected level.

As soon as the desired rates of deposition of each of the substances is obtained, the drive controlling means 28 for the wind-up reel 30 of substrate 26 is energized to move the substrate strips forward at the rate of about 0.2 centimeters per second past the opening 27a in the mask 27, through which the deposition takes place. With these rates of deposition of tin and niobium, and this rate of motion for the substrate, a continuous strip of film of about 10,000 angstrom units thick is deposited on each strip of the moving substrate 26.

The coated substrate 26 is moved at a uniform rate of 0.2 centimeters per second in the direction of the arrow, passing under the one-half inch aperture in shield 56, where it is bombarded by the horizontally swept ion beam 50, at energies up to 100,000 electron volts, while heating unit 61 maintains the temperature of the moving target at about 700° C.

The system is so designed that the ion beam sweeps a pattern roughly one-half inch wide (the width of the tape) and one-half inch in the direction of motion of the tape. The angular dispersion of the beam from the centerline is ±2°. Current density of the order of 2 microamperes per square centimeter is maintained at the target by the beam. The movement of the tape should be coordinated so that each passing increment is exposed to the beam for a period of about 5 seconds. The above-indicated current density, integrated over this period, will be sufficient to provide pinning sights to a depth of 0.5 microns at an average approximate density of $1.25\times10^{18}$ pinning sights per cubic centimeter.

The final product of the operations described with reference to the apparatus of FIG. 2A is indicated in longitudinal section in FIG. 2B. This comprises a ribbon in which the substrate is, for example, nickel-bearing steel, known by the tradename "Hastalloy B" (Union Carbide Corporation). Upon a substrate of the above composition, say, 50 microns thick, is deposited a film, 0.5 microns thick of $Nb_3Sn$ which has been ion bombarded to produce pinning sights through its depth to the approximate density indicated in the previous paragraph.

Films prepared by the process described are characterized by a current carrying capacity substantially in excess of $1\times10^6$ amperes per cm.$^2$ at 40 Kilogauss. Current carrying capacity of this magnitude makes the $Nb_3Sn$ film valuable for many superconductive applications.

Whereas the foregoing example illustrates the production of an endless moving strip of superconductive film, deposited on a ribbon or sheetlike substrate, it is within the contemplation of the invention that deposition and irradiation can take place on other types of substrates known in the art. Moreover, the successive deposition of additional base material, prior to the deposition of the superconductive film, and of a coating material after deposition of the superconductive film, are also within the contemplation of the invention. For example, cylindrical or spiral wound films of superconductive film can be deposited on a cylindrical jacket by successive deposition of a base material on the jacket, followed by the deposition of superconductive film in the manner described hereinbefore, followed in turn, if desired, by the successive deposition of a coating film over the superconductive film.

Figure 3A:
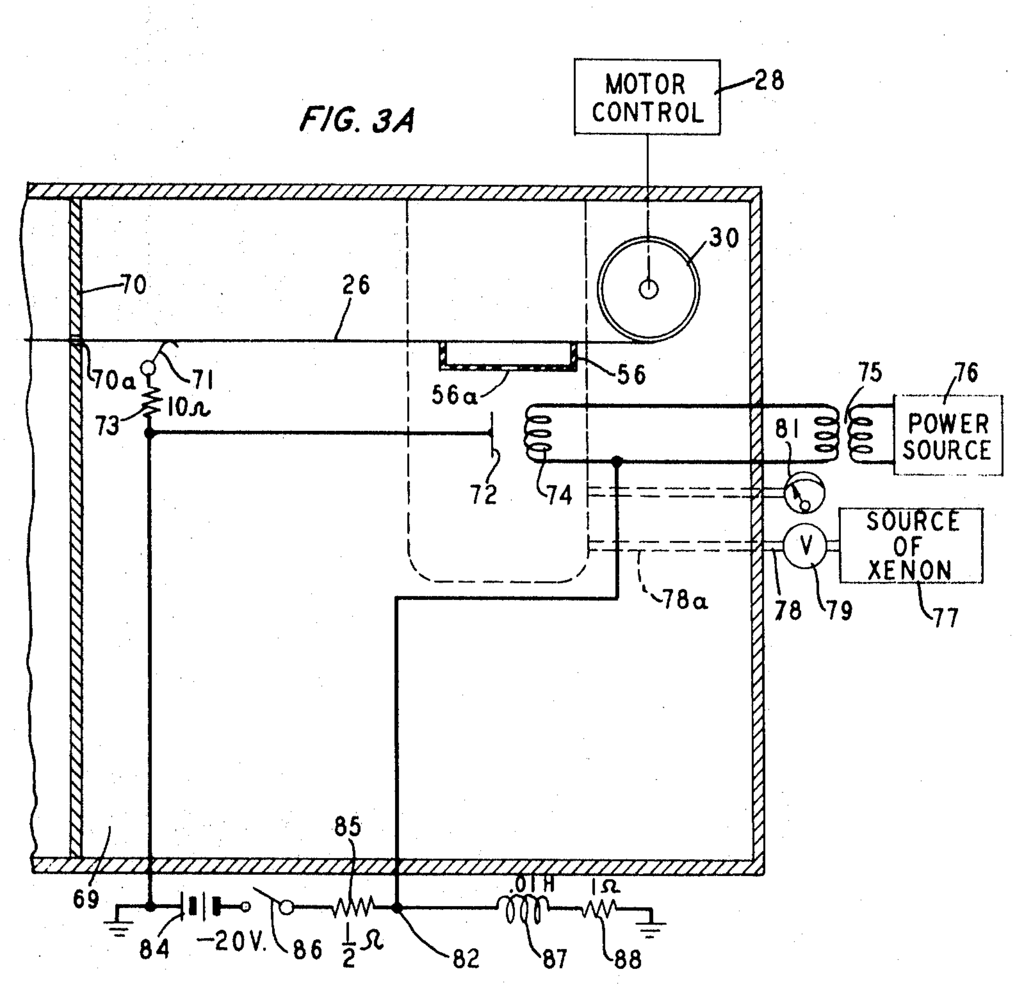
FIG. 3A is a modified form of the apparatus arrangement of FIG. 2A in which a compartment filled with ionized gas, including an anode and cathode, and means for periodically interrupting the energizing circuit, replaces the ion gun.

The arrangement indicated in FIG. 3A provides a modification of the ion bombardment section of FIG. 2A, replacing that portion of the structure to the right of the partition 70 in the housing 1 which separates the left-hand vacuum deposition chamber from the right-hand ion bombardment chamber 69. In the present embodiment, the latter is filled with ions of an inert, relatively heavy material, such as xenon, to a pressure within the range between about 10 microns and one-half millimeter of mercury. In addition to xenon, other inert gases, such as argon, may be used. Also, metallic vapors such as lead, zirconium, hafnium, and molybdenum, which have been supplied in a crucible and vaporized by the imposition of an electron beam, may be used for this purpose.

Prior to operation, the chamber 69 is first evacuated and back-filled several times with inert gas, such as xenon or argon, until tests indicate that the level of impurities has been reduced to about $10^{12}$ per cubic centimeter.

Once the desired pressure level of the bombarding gas or vapor has been attained in the chamber 69, such as by leaking gas in from the xenon source 77 through the conduit 78, this level is retained by replacing valve 79 with a semipermeable membrane designed to leak in gas at the desired flow rate to replace the gas ions absorbed in the bombardment process about to be described. The rate at which this occurs depends on the deionization time of the gas or vapor in each case.

The electrodes in chamber 69 include an anode 72, which may for example, comprise a conventional graphite element which is spaced apart, from the cathode 74. The latter may comprise a filament of, say, tungsten, tantalum, or molybdenum, which is connected through gas-tight seals in the housing 1 to the terminal of a transformer 75, which is connected to an appropriate source of power 76 which may be, for example, a conventional alternating current energizing circuit. The power source 76 is designed to operate a tungsten filament which, in the present embodiment, comprises a helical coil, at a temperature of about 2,300° Kelvin. In the case of a tantalum filament the optimum temperature would somewhat less, about 2,100° Kelvin.

Cathode 74 is connected through a gas-tight seal in the housing 1 to an external circuit through the junction 82. A first branch is connected from this junction through the one-half ohm resistor 85 to one terminal of the symbolic switch 86, whose other terminal is connected to the negative end of a 20 volt direct current power source 84, whose positive end is grounded. Another connection from the junction 82 leads through a circuit including the 0.01 Henry inductor 87 connected in series with a 1 ohm resistor 88 to ground.

The tape 26, on which has been deposited the $Nb_3Sn$ film, passes from the left-hand deposition portion of the chamber 1 to the ion bombardment chamber 69, through an aperture 70a in the partition 70. The latter is just wide enough to accommodate the passage of the tape, but small enough so that no appreciable pressure leak occurs between the two chambers due to the relatively low pressures in each. A wiper 71 rides on the conducting side of the tape 26. This is connected through a circuit including the 10 ohm resistor 73, which passes through a gastight seal in the housing 1 to a ground connection which is also directly connected to the anode 72.

The potential drop across the tube between electrodes 74 and 72 is about 10 volts in the present example, in which the bombardment chamber is filled with xenon. In alternative cases, in which the chamber is filled instead with, for example, argon, or mercury, the respective potential drops across the tube would be 8 and 10 volts. In the present example, the current drawn by the anode 72 is of the order of 10 amperes; and approximately 10 amperes passes into the inductor 87 to build up the desired opposing electromotive force.

It will be noted that as an alternative to the large compartment 69 to the right of partition 70, a much smaller compartment may be formed to enclose only anode 72, cathode 74, the passing tape 26, and means for supplying the gaseous environment, as indicated by the dotted line enclosure. Details for constructing such an enclosure are in accordance with well-known prior art principles.

During the period of forward current in the circuit, when the switch 86 is closed, a relatively low potential, of the order of 10 volts negative, is imposed on cathode 74, causing ordinary electron conduction between the latter and anode 72. During this stage of the operation, the gaseous environment within the enclosure 69 (or within the smaller dotted-line enclosure in the alternative case) becomes ionized, the ionizing period depending upon the gas employed. After a period of, say, 300 microseconds, which will be assumed to be the ionizing period in the present illustrative example, the circuit is broken by opening the switch 86, or alternatively, by the open circuit condition of a spark gap. The charge stored in the inductive circuit 87, 88 then imposes a large positive potential of the order of +1,000 volts on the cathode 74, thereby driving the ions toward the grounded anode 72 and a portion of the grounded tape 26, appearing in aperture **56*a* of the insulated shield 56. It will be noted that the tape 26 passes the aperture 56 which is, for example, 1 square centimeter in cross section at the rate of 0.2 centimeters per second. In practice this aperture is located closely adjacent to the anode 72, at a position between the anode and cathode. Thus, when the switch is open, a stream of high velocity ions having an energy of, say, 500 electron volts, is attracted in the direction of the anode 72, simultaneously impinging on the surface of the adjacent passing tape 26 through the aperture 56. As previously indicated, instead of the switch 86**, which merely symbolizes a make-and-break mechanism in the circuit, a conventional spark-gap mechanism may be substituted.

Figure 3B:
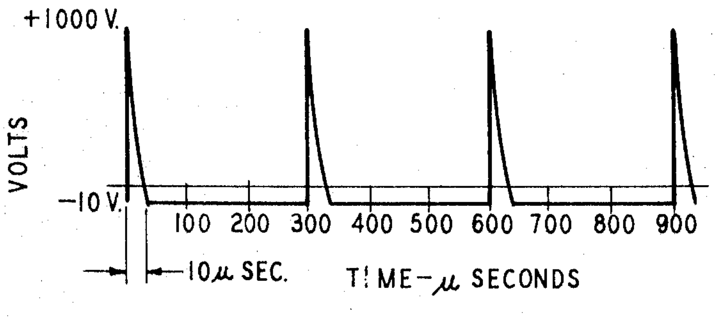
FIG. 3B is a graphical representation of periodic variations in the cathode potential in the circuit of FIG. 3A.

FIG. 3B is a schematic showing of the variations with time of the direct current component imposed on the cathode 74. The period between the high positive pips may be, for example, between 300 and 1,000 microseconds, depending on the deionization time of the gas in each application. For example, assuming the deionization time to be 300 microseconds, the period between voltage maxima is 300 microseconds, and the duration of the voltage maximum in each case is 10 microseconds, as indicated in the figure. The gas, which is slowly used up by this process, may be very slowly replenished by use of a suitable mechanism known in the art, such as, for example, a semipermeable membrane replacing the valve 79 in the conduit leading to the xenon source 77. The latter is designed to admit xenon at the desired rate, which in this case would be of the order of cubic centimeters per second.

The ion bombardment process just described is similar to the action that is usually known as "gas clean up" which takes place in gas filled tubes when the forward conducting current is suddenly cutoff, permitting the tube to become deionized.

Figure 4:
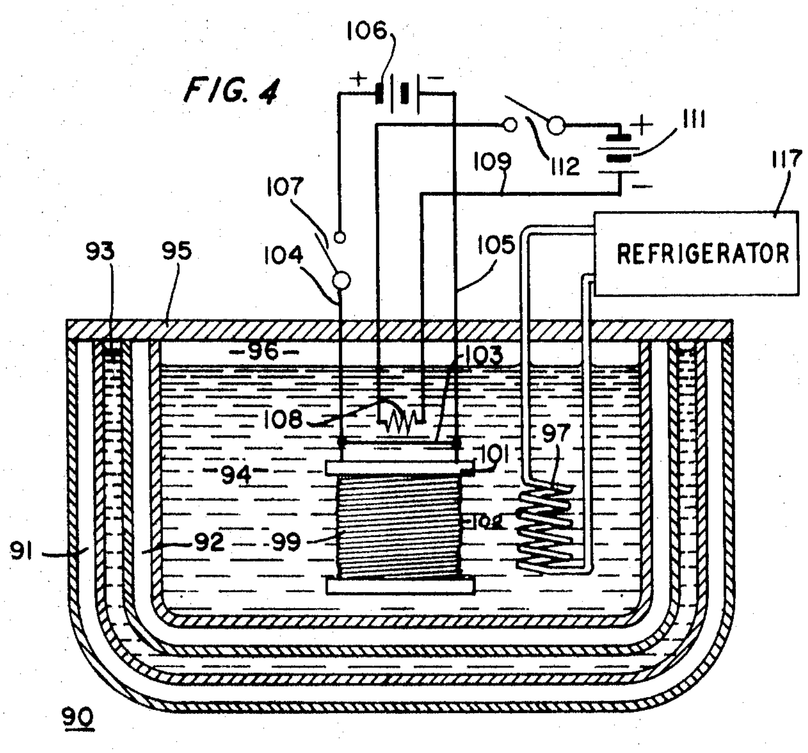
FIG. 4 is a schematic showing of a system in which a superconductive product prepared in accordance with the present invention is included in an operative cryogenic environment.

It will be understood that a ribbon prepared in the manner described hereinbefore may serve many purposes and be useful in many types of applications in which superconductive materials are specified. For example, ribbon so prepared may be wound into a superconducting magnet which is assembled for operation in a cryogenic environment 90, which may take the form indicated in FIG. 4 of the drawings. The magnet 99 is interposed in a double-walled Dewar-type flask having inner and outer vacuum chambers 91 and 92 which include between them an intermediate chamber 93 containing liquid nitrogen. The Dewar-type container 90 is closed at the top by a hermetically sealed metal lid 95, comprising any of the metals well known in the art for cryogenic applications. Prior to operation of the device, the Dewar-type container 90 is filled with a bath of liquid helium 94 to a point near the top, the space between the top of the liquid 94 and the top 95 being filled with gas helium 96. The helium bath 94 is kept at a temperature within the range 1–10° Kelvin by means of a system comprising a refrigeration circuit 97 of any type well known in the art for application in the temperature range of interest. Suitable types for this application are disclosed in pages 57 to 73 of *Cryogenic Engineering* by Russell B. Scott, D. Van Nostrand Co., Inc. 1957 Edition.

The magnet 99, which comprises a large number of turns 102 comprising ribbon of the type described hereinbefore, is mounted on a mandrel or spool 101. This may comprise, for example, a hollow cylindrical structure of aluminum, perforated to allow circulation of a coolant, which may, for example, be a helium bath circulating internally and externally of the magnetic coil 99. Connected to the two ends of the superconducting coil 102 is a pair of ordinary conducting wires 104 and 105 which are passed through hermetical seals in the lid 95. The lead 104 passes through a single-throw control switch 107 to the positive terminal of a source of power 106 for energizing the magnet 99. The negative terminal of the source 106 is connected to lead 105. The wires 104 and 105 are interconnected across the magnet 99 by a shunt 103. Adjacent the shunt 103 is a high resistance heating coil 108 which is energized through a pair of normally conducting leads 109 and 110. These pass through hermetical seals in the lid 95 and are connected to opposite terminals of a source of power 111 under control of the switch 112. The heating coil 108 serves to control the operation of the superconducting coil 102, by raising the coil above the superconducting range of temperatures when it is desired to terminate the superconducting state in the magnet 99.

It will be understood that superconductive material fabricated in accordance with the teachings of the present invention can be employed as a component part of other types of superconducting circuits, than the magnet described herein by way of illustration; and that variations in the structure and techniques of the present invention from the illustrative examples herein described will be apparent to those skilled in the art, within the scope of the appended claims.

What is claimed is:

1. The method of treating a superconductive material to improve its characteristics which comprises bombarding said material with ions of at least about the atomic weight of argon for causing disorientations in the lattice structure of said material of sufficient magnitude to form flux pinning sites, said disorientations comprising nonuniformities having dimensions at least of the order of magnitude of the coherence distance in the crystal lattice of said superconducting material.

2. The method in accordance with claim 1 wherein said material is bombarded with a beam from an ion gun, the ions of said beam having an average energy of at least about 10,000 electron volts.

3. The product of the process of claim 2, and means for maintaining said product in a cryogenic environment at a temperature below the critical temperature of the superconductive film formed by said process.

4. The product-by-process of claim 2.

5. The product-by-process of claim 1.

6. The method in accordance with claim 1, wherein said superconductive material is interposed in the area immediately adjacent the path between the anode and cathode electrodes of an electron discharge device disposed in a vapor filled enclosure, operating said device in a forward direction of current conduction until said vapor becomes ionized, and subsequently imposing between said electrodes a reverse potential of at least about 500 volts for driving said ions into said superconductive material 7. The produce of the process of claim 6, and means for maintaining said product in a cryogenic environment at a temperature below the critical temperature of the superconductive film formed by said process.

8. The product-by-process of claim 6.

9. The product of the process of claim 1, and means for maintaining said product in a cryogenic environment at a temperature below the critical temperature of the superconductive film formed by said process.

* * * * *

UNITED STATES PATENT OFFICE
CERTIFICATE OF CORRECTION

Patent No. 3,615,881 Dated October 26, 1971

Inventor(s) William J. Greene

It is certified that error appears in the above-identified patent and that said Letters Patent are hereby corrected as shown below:

Col. 1, line 9, "$T_o$" should read -- $T_c$ --.

Col. 2, line 19, the word "of" should be placed after "ribbon" and before "substrate";
line 32, the word "of" should be placed after "ribbon" and before "substrate".

Col. 4, line 5, the word "there" should be placed after "system" and before "illustrated";
line 37, "$10^{15}$" should read -- $10^{-5}$ --;
line 68, "The" should read -- These --.

Col. 5, line 8, "No." should be deleted.

Col. 6, line 29, "hereinbelow" should read -- hereinbefore --;
line 69, "$10^{15}$" should read -- $10^{-5}$ --;
line 74, "$10^{17}$" to $10^{18}$" should read -- $10^{-7}$ to $10^{-8}$ --;

Col. 7, line 66, "$10^{16}$" should read -- $10^{-6}$ --;
line 70, "$10^{13}$" should read -- $10^{-3}$ --.

Col. 8, line 68, the word "the" should be placed after "In" and before "other";
line 71, "$10^{15}$" should read -- $10^{-5}$ --.

Col. 10, line 31, "$10^{12}$" should read -- $10^{-12}$--;
line 52, the word "be" should be placed after "would" and before "somewhat".

Col. 12, line 72, "produce" should read -- product --.

Signed and sealed this 9th day of May 1972.

(SEAL)
Attest:

EDWARD M.FLETCHER,JR.
Attesting Officer

ROBERT GOTTSCHALK
Commissioner of Patents